(12) United States Patent
Narayanan et al.

(10) Patent No.: US 11,509,529 B2
(45) Date of Patent: Nov. 22, 2022

(54) SWITCH COMPONENT SECURE UPGRADE SYSTEM

(71) Applicant: Dell Products L.P., Round Rock, TX (US)

(72) Inventors: Padmanabhan Narayanan, Redmond, WA (US); Paavaanan Tamillraivan Nandhini, Guduvanchery (IN); Karthik Gengan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 17/002,915

(22) Filed: Aug. 26, 2020

(65) Prior Publication Data

US 2022/0070056 A1    Mar. 3, 2022

(51) Int. Cl.
    *G06F 8/654*     (2018.01)
    *H04L 41/082*    (2022.01)
    *H04L 67/00*     (2022.01)

(52) U.S. Cl.
    CPC ............ *H04L 41/082* (2013.01); *G06F 8/654* (2018.02); *H04L 67/34* (2013.01)

(58) Field of Classification Search
    CPC ....... H04L 41/082; H04L 67/34; G06F 8/654; G06F 8/65
    See application file for complete search history.

(56) References Cited

U.S. PATENT DOCUMENTS

| | | | | |
|---|---|---|---|---|
| 2009/0217054 A1* | 8/2009 | Haider | ................... | H04L 9/3247 713/189 |
| 2017/0075676 A1* | 3/2017 | Li | .............................. | G06F 8/65 |
| 2020/0097281 A1* | 3/2020 | Haramaty | ................. | G06F 8/65 |
| 2020/0257518 A1* | 8/2020 | Liedtke | ...................... | G06F 8/65 |

OTHER PUBLICATIONS

Kenneth Goldman et al. "Best Practices for Firmware Code Signing," OPEN Compute Project, 24 Pages, https://www.opencompute.org/documents/ibm-white-paper-best-practices-for-firmware-code-signing.

* cited by examiner

*Primary Examiner* — S. Sough
*Assistant Examiner* — Chenega Smith
(74) *Attorney, Agent, or Firm* — Joseph Mencher (57) ABSTRACT

A switch component secure upgrade system includes a dual-ported switch component, a central processing system that is connected to the switch component via the components read-only port, and a management controller system that is connected to the switch component via the components read-write port. The management controller system receives a component upgrade request that is encrypted with a management controller public key, decrypts the component upgrade request using a management controller private key, and validates the component upgrade request, which is signed with a release management private key, using a release management public key. In response to validating the component upgrade request, the management controller system validates a component upgrade payload that is included in the component upgrade request and, in response, upgrades the switch component via the read-write port using the component upgrade payload.

20 Claims, 6 Drawing Sheets

SWITCH COMPONENT SECURE UPGRADE SYSTEM

BACKGROUND

The present disclosure relates generally to information handling systems, and more particularly to performing secure upgrades to components in switch information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, include components that may occasionally need to be upgraded in order to, for example, enable addition features on the switch device, fix bugs in the switch device, and/or for other upgrade purposes known in the art. Furthermore, some switch devices may be provided according to specifications promulgated by the Open Compute Networking Project, which attempts to define an "open" switch device, and which has resulted in new Development Operations (DevOps) methodologies that provide for separate "control" of the switch platform, control plane, data plane, and/or other aspects of the switch device. This has further resulted in particular components in the switch device (e.g., the Electronically Erasable Programmable Read Only Memory (EEPROM) device, the boot flash device, the diagnostics storage device, the Field Programmable Gate Array (FPGA) device or Complex Programmable Logic Device (CPLD) device, etc.) being under the control of switch platform providers such as DELL® Inc. of Round Rock, Tex., United States. As such, in addition to switch platform quality, features, and performance, switch platform providers have begun to focus on the ease of switch device deployment (e.g., via automation), switch device support costs, and/or other issues that switch device customers associate with the switch platform provider and that can be effected by upgrades performed on the switch-platform-provider-controlled components in the switch device.

While customers employ different DevOps strategies, most customers tend to employ a release management team that operates to qualify component upgrades received from the switch platform provider, an Information Technology (IT) operations team that "pushes" or otherwise provides component upgrades to the switch devices utilized by the customer, and a support team that provides support for any issues associated with the component upgrades deployed on the switch devices that are utilized by the customer. Furthermore, one of skill in the art will recognize that the customer may provide some of the teams described above "in-house" (e.g., the release management team), while outsourcing other teams (e.g., the IT operations team and the support team), and often the outsourced teams tend to have relatively little knowledge of the switch platform. It has been discovered that conventional DevOps strategies like those discussed above tend to result in issues with regard to upgrades of switch-platform-provider-controlled components in switch devices.

For example, the IT operations team and/or support team discussed above may perform unauthorized upgrades on switch-platform-provider-controlled components in the switch device that bypass the release management team, authorized users may perform component upgrades utilizing upgrade binaries that were not built by the switch platform provider, component upgrades may be performed out of order, switch-platform-provider-controlled components may be upgraded using the wrong component upgrade version, component upgrades may be aborted during the upgrade process and result in component corruption, switch-platform-provider-controlled components may be upgraded with incorrect data, and/or other upgrade issues that can result in operation issues with the switch device. As will be appreciated by one of skill in the art in possession of the present disclosure, such upgrade issues with switch-platform-provider-controlled components often result in maintenance calls to the switch platform provider, and can require extensive resources of the switch platform provider in order to remedy.

Accordingly, it would be desirable to provide a switch component secure upgrade system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a management agent that is configured to: receive a component upgrade request that is encrypted with a management controller public key; decrypt the component upgrade request using a management controller private key; validate the component upgrade request, which is signed with a release management private key, using a release management public key; validate, in response to validating the component upgrade request, a component upgrade payload that is included in the component upgrade request; and upgrade, in response to validating the component upgrade payload, a switch component using the component upgrade payload and via a read-write communication channel that is the only read-write communication channel connected to the switch component.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
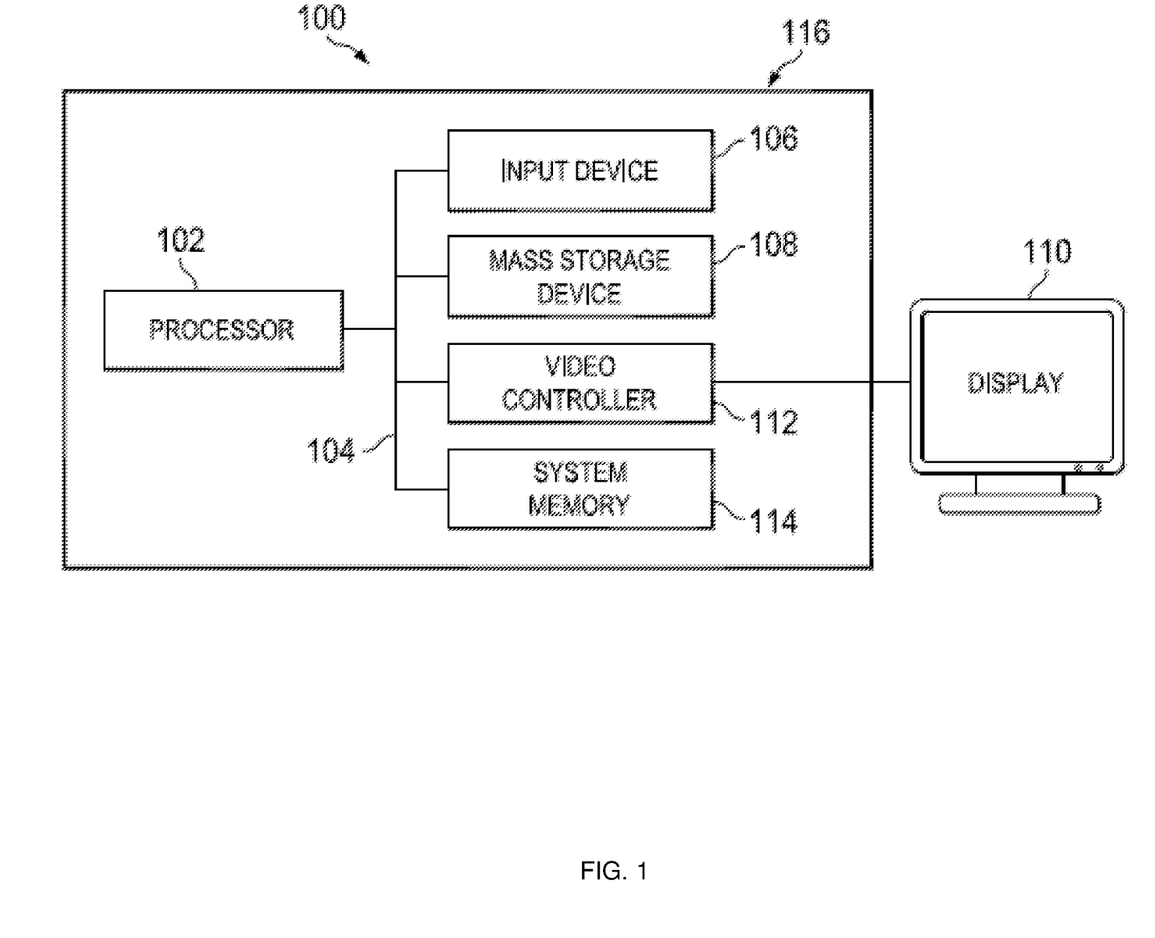
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
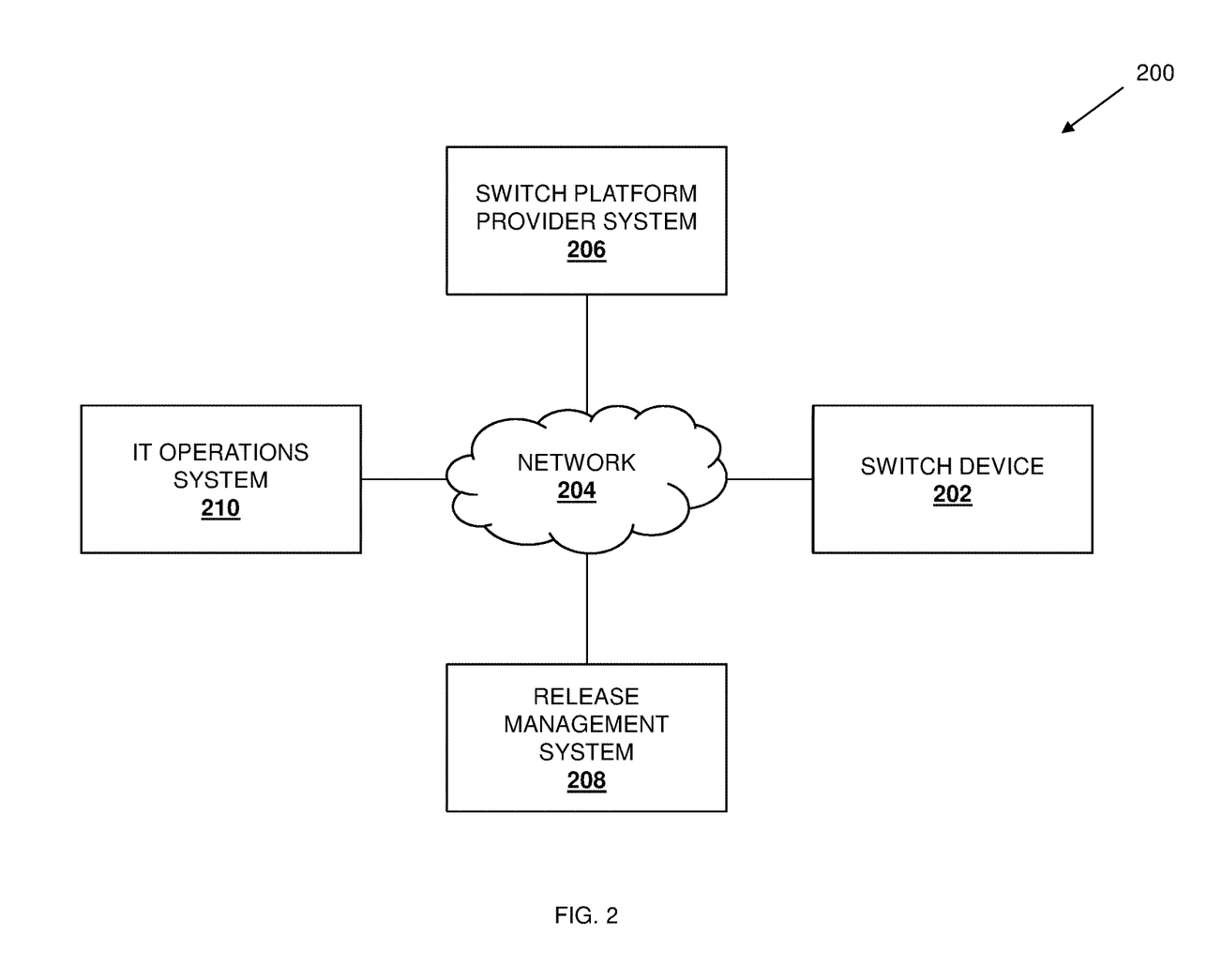
FIG. 2 is a schematic view illustrating an embodiment of networked system that may utilize the switch component secure upgrade system of the present disclosure.

Referring now to FIG. 2, an embodiment of a networked system 200 is illustrated that may utilize the switch component secure upgrade system of the present disclosure. In the illustrated embodiment, the networked system 200 includes a switch device 202. In an embodiment, the switch device 202 may be provided by the IHS 100 discussed above with reference to FIG. 1, and/or may include some or all of the components of the IHS 100. However, while illustrated and discussed as being provided by a switch device, one of skill in the art in possession of the present disclosure will recognize that components in other types of devices may be upgraded according to the teachings of the present disclosure while remaining within its scope as well. In the illustrated embodiment, the switch device 202 is coupled to a network 204 that may be provided by a Local Area Network (LAN), the Internet, combinations thereof, and/or other networks that would be apparent to one of skill in the art in possession of the present disclosure.

In the illustrated embodiment, a switch platform provider system 206 is also coupled to the network 204. In an embodiment, the switch platform provider system 206 may be provided by the IHS 100 discussed above with reference to FIG. 1, and/or may include some or all of the components of the IHS 100, and in a specific example may include one or more server devices that are configured to generate and transmit component upgrades for components in the switch device 202, as well as perform any of the other functionality discussed below. As discussed above, the switch platform provider system 206 may be operated by a switch platform provider that provides the switch device 202 as part of a switch platform and according to specifications promulgated by the Open Compute Networking Project such that the switch device 202 may be considered an "open" switch device that provides for separate "control" of the switch platform, control plane, data plane, and/or other aspects of the switch device 202. As such, particular components in the switch device 202 (e.g., the Electronically Erasable Programmable Read Only Memory (EEPROM) device, the boot flash device, the diagnostics storage device, the Field Programmable Gate Array (FPGA) device or Complex Programmable Logic Device (CPLD) device discussed below) may be considered to be "under the control" of the switch platform provider, and thus should be upgraded via component upgrades provided using the switch platform provider system 206.

In the illustrated embodiment, a release management system 208 and an IT operations system 210 are also coupled to the network 204. As discussed above, the release management system 208 may be provided by the IHS 100 discussed above with reference to FIG. 1, and/or may include some or all of the components of the IHS 100, and in a specific example may include one or more server devices that are configured to receive component upgrades for components in the switch device 202 from the switch platform provider system 206, and qualify those component upgrades for provisioning on the switch device 202. As also discussed above, the IT operations system 210 may be provided by the IHS 100 discussed above with reference to FIG. 1, and/or may include some or all of the components of the IHS 100, and in a specific example may include one or more server devices that are configured to "push" or otherwise provide component upgrades that have been qualified by the release management system 208 to the switch device 202.

In a specific example, a customer of the switch platform provider may purchase the switch device 202 (i.e., as one of many switch devices utilized by the customer) and may utilize the release management system 208 and the IT operations system 210 to upgrade components in that switch device 202 and, similarly as discussed above, the release management system 208 and/or the IT operations system 210 may controlled by the customer and/or third-party providers. In the examples below, the release management system 208 (and corresponding release management team) may be considered the "switch device owner", while the IT operations system (and corresponding IT operations team) is an entity attempting to upgrade component(s) in the switch device, but one of skill in the art in possession of the present disclosure will appreciate that other switch device owners and entities attempting to upgrade switch devices will fall within the scope of the present disclosure as well. As such, while a specific networked system 200 has been illustrated and described in which the switch component secure upgrades of the present disclosure may be performed, one of skill in the art in possession of the present disclosure will recognize that the secure component upgrades of the present disclosure may be performed in networked systems that include a variety of device, components, and device/component configurations while remaining within the scope of the present disclosure as well.

Figure 3:
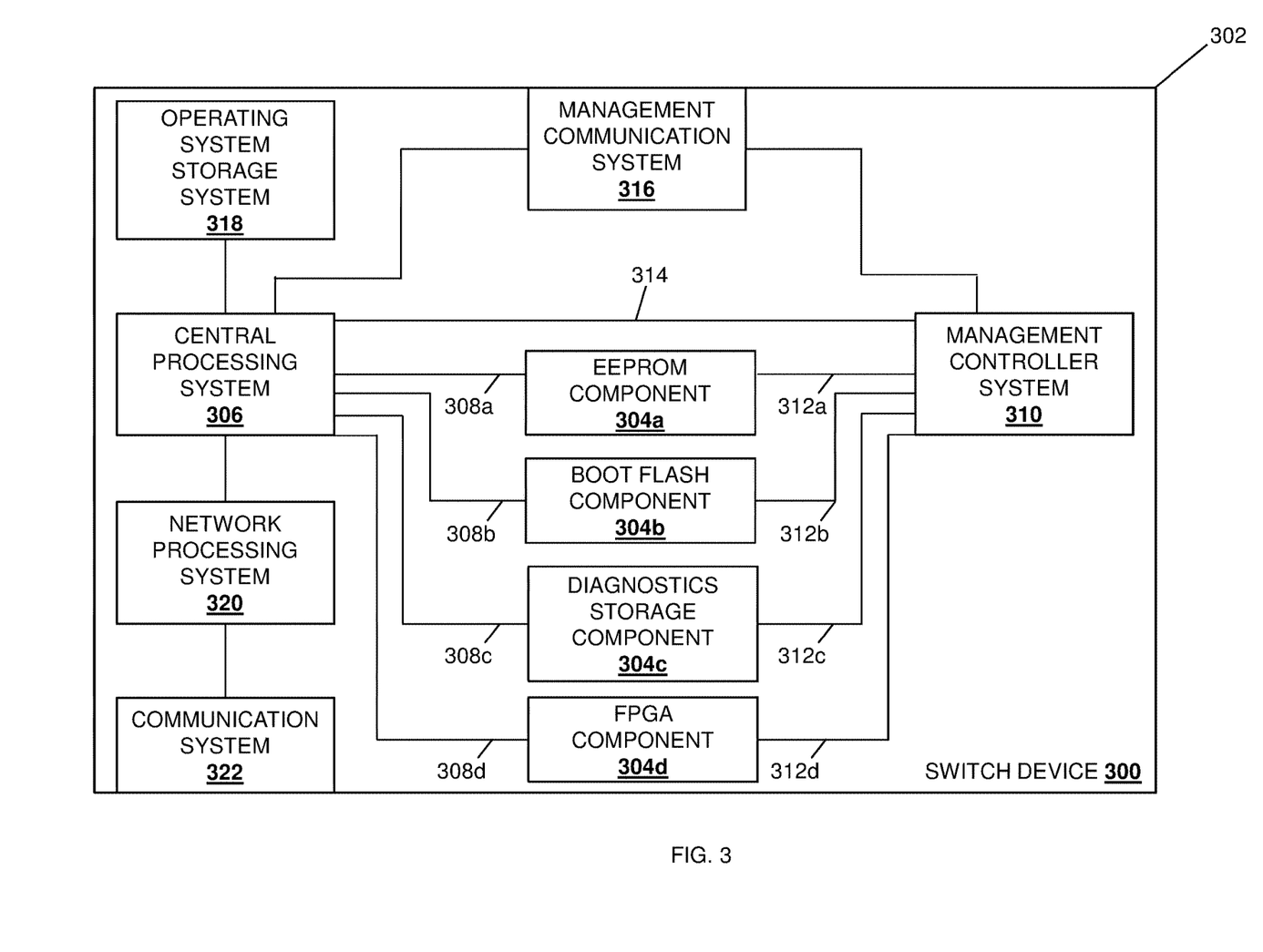
FIG. 3 is a schematic view illustrating an embodiment of a switch device that may be included in the networked system of FIG. 2 and that may include the switch component secure upgrade system of the present disclosure.

Referring now to FIG. 3, an embodiment of a switch device 300 is illustrated that may provide the switch device 202 discussed above with reference to FIG. 2. As such, the switch device 300 may be provided by the IHS 100 discussed above with reference to FIG. 1 and/or may include some or all of the components of the IHS 100. Furthermore, while illustrated and discussed as being provided by a switch device, one of skill in the art in possession of the present disclosure will recognize that the functionality of the switch device 300 discussed below may be provided by other devices that are configured to operate similarly as the switch device 300 discussed below. In the illustrated embodiment, the switch device 300 includes a chassis 302 that houses the components of the switch device 300, only some of which are illustrated below.

For example, the chassis 302 may house a plurality of components that, as discussed above, may be under the "control" of the switch platform provider and that, in the illustrated embodiments below, include an EEPROM component 304a, a boot flash component 304b, a diagnostics storage component 304c (e.g., an Open Network Install Environment (ONIE) and diagnostics Solid State Drive (SSD)), and an FPGA component 304d, and that one of skill in the art in possession of the present disclosure will recognize may include a variety of other components (e.g., a CPLD component) as well. As would be appreciated by one of skill in the art in possession of the present disclosure, the components 304a-304d may be considered to be "owned" or under "control" of the switch platform provider discussed above in that the switch platform provider is considered by the customer as responsible for the proper operation of those components 304a-304d via the component upgrades discussed below, as well as based on any other ownership or control considerations known in the art. As discussed in further detail below, each of the components 304a-304d may be provided by dual-port components that may be connected to different processing systems or controller systems (e.g., the two SoCs in the examples provided below), and thus may utilize or otherwise implement any of a variety of dual-port technologies that would be apparent to one of skill in the art in possession of the present disclosure.

In the illustrated embodiment, a central processing system 306 is also included in the chassis 302. In an embodiment, the central processing system 306 may be provided by a host Central Processing Unit (CPU) System on Chip (SoC) and may be configured to perform ONIE operations, DELL® DIAG-OS diagnostics operations, Network Operating System (NOS) operations, and/or other host CPU SoC operations that would be apparent to one of skill in the art in possession of the present disclosure. In the illustrated embodiment, the central processing system 306 is connected to one of the ports on the dual-port EEPROM component 304a via a communication channel 308a, to one of the ports on the dual-port boot flash component 304b via a communication channel 308b, to one of the ports on the dual-port diagnostics storage component 304c via a communication channel 308c, and to one of the ports on the dual-port FPGA component 304d via a communication channel 308d. In a specific example, the communication channel 308a may be provided by an Inter-Integrated Circuit (I2C) channel, the communication channel 308b may be provided by a Serial Peripheral Interface (SPI) channel, the communication channel 308c may be provided by Serial Attached Storage (SAS) or Peripheral Component Interconnect express (PCIe) channel, and the communication channel 308d may be provided by a Local Inter-Process (LPC) or PCIe or I2C channel. However, while the central processing system 306 is described as connected to the components 304a-304d via particular communication channels, one of skill in the art in possession of the present disclosure will recognize that a variety of connections/communication channels may be provided between a central processing system and dual port components while remaining within the scope of the present disclosure as well.

As discussed in further detail below, a portion of the security provided in the switch component secure upgrade system of the present disclosure is enabled via the configuration of the communication channels 308a-308c as read-only, which allows the central processing system 306 to read from each of the components 304a-304c via the communication channels 308a-308c, but prevents writes that could otherwise be utilized to upgrade those components 304a-304c via the communication channels 308a-308c. For example, central-processing-system-facing ports on a dual port component may be configured as read-only via disablement of write functionality during manufacturing by the component provider/vendor, using hardware strapping to configure a port capable of reads and writes to read-only by the switch device manufacturer/switch platform provider, via the management controller system (discussed below) configuring the central-processing-system-facing port as read-only following power up and before the central processing system 306 is powered up (e.g., in situations where the component does not support hardware strapping), and/or using other techniques that would be apparent to one of skill in the art in possession of the present disclosure.

Furthermore, while the communication channel 308d to the FPGA component 304d (or a CPLD component) may allow writes to registers in the FPGA component 304d, one of skill in the art in possession of the present disclosure will appreciate that those writes cannot be utilized to perform upgrades on the FPGA component 304d without being configured as Joint Test Action Group (JTAG) standard writes emulated via a General Purpose Input/Output (GPIO) as discussed below. As such, one of skill in the art in possession of the present disclosure will appreciate that the communication channels 308a-308d may be configured in any of a variety of manners in order to prevent upgrades from being performed via the central processing system 306.

In the illustrated embodiment, a management controller system 310 is also included in the chassis 302. In an embodiment, the management controller system 310 may be provided by a Platform Management Controller (PMC) SoC or Baseboard Management Controller (BMC) SoC, and may be configured to perform a variety of management operations that would be apparent to one of skill in the art in possession of the present disclosure. As will be appreciated by one of skill in the art in possession of the present disclosure, the management controller system 310 may operate as the Root of Trust for the switch device 300 in the examples below to provide the component upgrade security described herein. In the illustrated embodiment, the management controller system 310 is connected to one of the ports on the dual-port EEPROM component 304a via a communication channel 312a, to one of the ports on the dual-port boot flash component 304b via a communication channel 312b, to one of the ports on the dual-port diagnostics storage component 304c via a communication channel 312c, and to one of the ports on the dual-port FPGA component 304d via a communication channel 312d. In a specific example, the communication channel 312a may be provided by an I2C channel, the communication channel 312b may be provided by an SPI channel, the communication channel 312c may be provided by SAS or PCIe channel, and the communication channel 312d may be provided by an LPC or PCIe or I2C channel. However, while the management controller system 310 is described as connected to the components 304a-304d via particular communication channels, one of skill in the art in possession of the present disclosure will recognize that a variety of connections/communication channels may be provided between the management controller system 310 and dual port components while remaining within the scope of the present disclosure as well.

As discussed in further detail below, a portion of the security provided in the switch component secure upgrade system of the present disclosure is provided via the configuration of the communication channels 312a-312d as read-write, which allows the management controller system 310 to both read from and write to each of the components 304a-304c via the communication channels 312a-312d, with writes utilized to upgrade those components 304a-304c via the communication channels 312a-312c as described below. As such, component upgrades must be performed using the management controller system 310 and via the read-write communication channels 312a-312d, while "side-channel attacks" via the central processing system 306 are prevented (i.e., due to the communications channels 308a-308d being read-only).

In particular, with regard to the communication channel 312d to the FPGA component 304d (or a CPLD component), the management controller system 310 may be configured to perform upgrades on the FPGA component 304d via JTAG standard writes emulated via a GPIO, which one of skill in the art in possession of the present disclosure will recognize allows for the provisioning of upgrades to an FPGA component, a CPLD component, or other similar components known in the art. As such, one of skill in the art in possession of the present disclosure will appreciate that the communication channels 312a-312d may be configured in any of a variety of manners in order to allow upgrades to be performed via the management controller system 310. Furthermore, the management controller system 310 may be configured (e.g., via registers in the management controller system 310) such that each of the communication channels 312a-312c are write-protected, and the write protection must be disabled (e.g., via a write to the corresponding registers in the management controller system 310) in order to perform writes/upgrades via the communication channels 312a-312c.

As illustrated in FIG. 3, the central processing system 306 and the management controller 310 may be directly connected to each other via communication link 314 that may be provided by, for example, a host-BMC/PMC link that may include an LPC link, an Ethernet link, and/or other communication links known in the art. Furthermore, a management communication system 316 may be coupled to each of the central processing system 306 and the management controller system 310 and, as discussed below, may provide access to a management network that is part of the network 204 discussed above with reference to FIG. 2 and that is accessible via management port(s) on the switch device 300. In the illustrated embodiment, an operating system storage system 318 is included in the chassis 302 and coupled to the central processing system 306 (e.g., via a SATA or PCIe connector), and may be provided by an SSD that stores a Network Operating System (NOS) utilized by the switch device 300.

Furthermore, a network processing system 320 is coupled to the central processing system 306 and may be provided by a Network Processing Unit (NPU)/Application Specific Integrated Circuit (ASIC) complex (e.g., including Media Access Control (MAC) and physical layer (PHY) components), with the network processing system 320 coupled to a communication system 322 that includes switch ports on the switch device 302 that are connected to a host network that is part of the network 204 discussed above with reference to FIG. 2. However, while a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
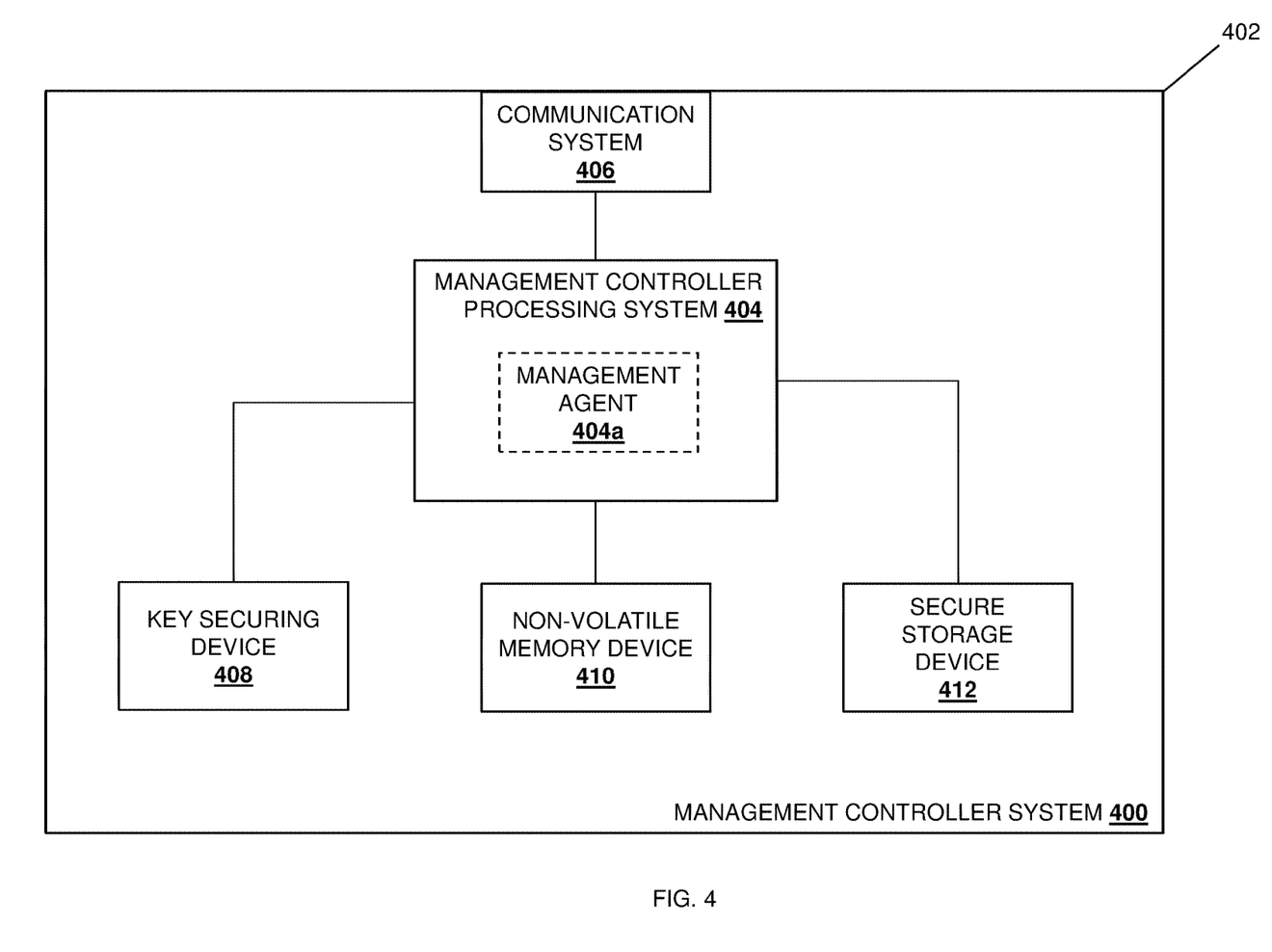
FIG. 4 is a schematic view illustrating an embodiment of a management controller system that may be included in the switch device of FIG. 3 and that may provide some of the switch component secure upgrade functionality of the present disclosure.

Referring now to FIG. 4, an embodiment of a management controller system 400 is illustrated that may provide the management controller system 310 discussed above with reference to FIG. 3. As such, the management controller system 400 may be provided by the IHS 100 discussed above with reference to FIG. 1 and/or may include some or all of the components of the IHS 100, and in specific examples may be provided by a PMC SoC or a BMC SoC. Furthermore, while illustrated and discussed as being provided by a PMC SoC or BMC SoC, one of skill in the art in possession of the present disclosure will recognize that the functionality of the management controller system 400 discussed below may be provided by other devices that are configured to operate similarly as the management controller system 400 discussed below.

In the illustrated embodiment, the management controller system 400 includes a chassis 402 (e.g., a circuit board) that supports the components of the management controller system 400, only some of which are illustrated below. For example, the chassis 402 may support a management controller processing system 404 that may be provided by a PMC-embedded CPU, a BMC-embedded CPU, and/or other processing systems that would be apparent to one of skill in the art in possession of the present disclosure. The chassis 402 may also support a memory system (not illustrated, but which may include the memory 114 discussed above with reference to FIG. 1) that is coupled to the management controller processing system 404 and that includes instructions that, when executed by the management controller processing system 404, cause the management controller processing system 404 to provide a management agent 404a that is configured to perform the functionality of the management agents and/or management controller systems discussed below.

The chassis 402 may also support a communication system 406 that is coupled to the management controller processing system 404 and that may provide any of the connections to the management controller system 310/400, including the I2C connection to the EEPROM component 304a, the SPI connection to the boot flash component 304b, the SAS or PCIe connection to the diagnostics storage component 304c, the LPC or PCIe or I2C connection to the FPGA component 304d, the host-PMC/BMC link to the central processing system 306, the connection to the management communication system 316, and/or any other communication components and/or connections that would be apparent to one of skill in the art in possession of the present disclosure. In the illustrated embodiment, the chassis 402 also supports a key securing device 408 that is coupled to the management controller processing system 404 and that may be provided by a SAFEVAULT® device available in PMCs/BMCs provided by DELL® Inc. of Round Rock, Tex., United States; a non-volatile memory device 410 that is coupled to the management controller processing system 404 and that may be provided by an embedded Non-Volatile Memory (eNVM) device; and a secure storage device 412 that is coupled to the management controller processing system 404 and that may be provided by an SSD.

In an embodiment, the key securing device 408 may be integrated into an SoC that provides the management controller system 400, or may be provide by a subsystem (e.g., a DELL® CONTROLVAULT® subsystem) that is external and connected to an SoC that provides the management controller system 400, and as discussed below may be utilized as a key store that is only accessible to the management controller system 400. In a specific example, the key securing device 408 may include a Physically Unclonable Function (PUF) (e.g., that is intrinsic to the BMC/PMC SoC), with the PUF configured to generate an SoC-specific management controller system public/private key pair. However, while a specific management controller system 400 has been illustrated, one of skill in the art in possession of the present disclosure will recognize that management controller systems (or other devices operating according to the teachings of the present disclosure in a manner similar to that described below for the management controller system 400) may include a variety of components and/or component configurations for providing conventional management controller functionality, as well as the functionality discussed below, while remaining within the scope of the present disclosure as well.

Figure 5:
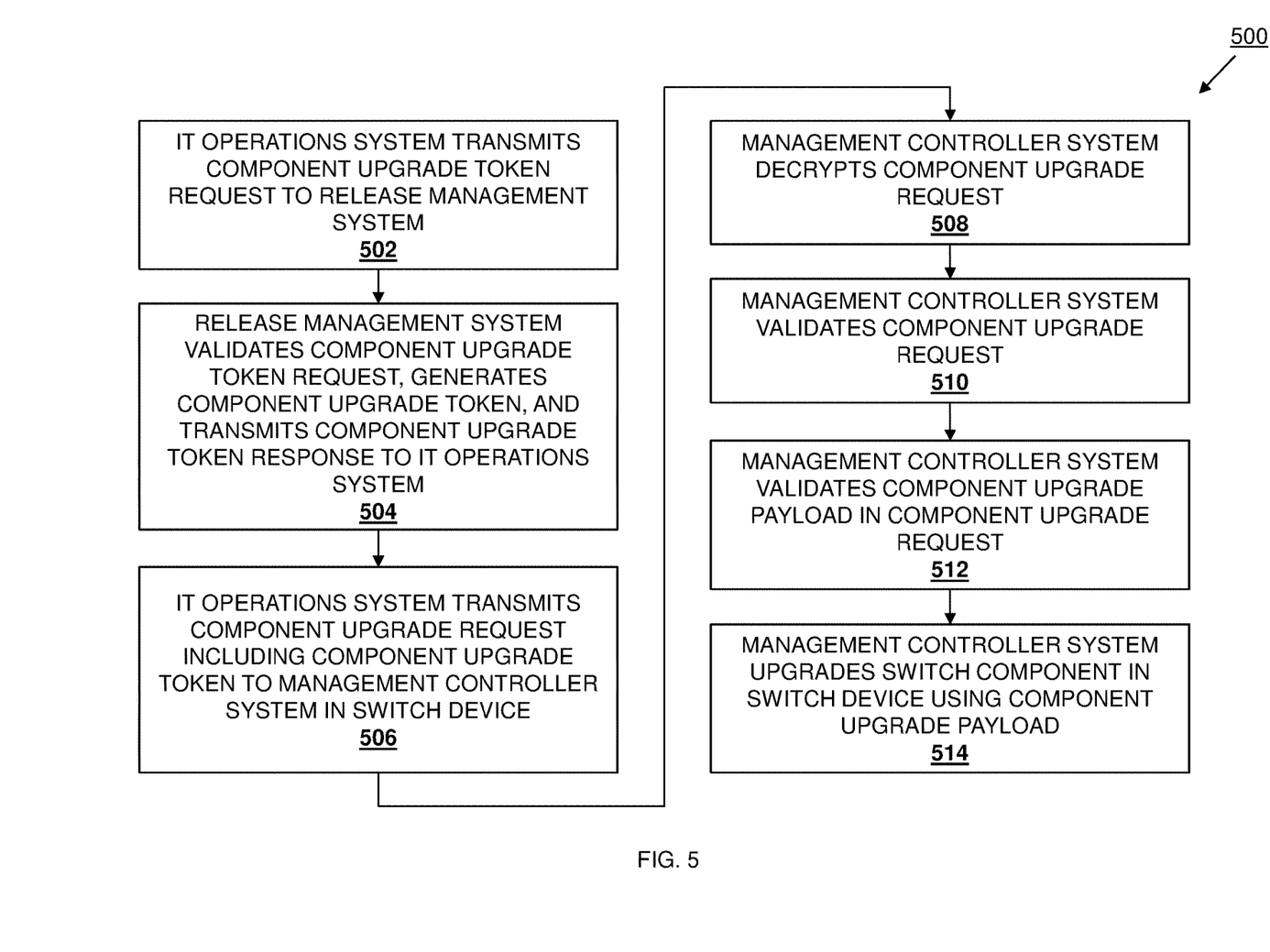
FIG. 5 is a flow chart illustrating an embodiment of a method for securely upgrading a switch component.

Referring now to FIG. 5, an embodiment of a method 500 for securely upgrading switch components is illustrated. As discussed below, the systems and methods of the present disclosure provide for secure updates of component in a switch device by requiring an entity wishing to provide a component update (e.g., the IT operations system in the examples below) to procure a component upgrade token that is authorized by a switch device "owner" (e.g., the release management system in the examples below), and produce that component upgrade token to a management agent in the switch device that will only perform the component upgrade if the component upgrade token and associated component upgrade payload are validated. For example, the switch component secure upgrade system of the present disclosure may include a switch component coupled to a central processing system via a read-only communication channel, and to a management controller system via a read-write communication channel. The management controller system receives a component upgrade request that is encrypted with a management controller public key, decrypts the component upgrade request using a management controller private key, validates the release-management-private-key-signed component upgrade request using a release management public key, validates a component upgrade payload that is included in the component upgrade request and, in response, upgrades the switch component via the read-write communication channel using the component upgrade payload. As such, only switch-owner-authorized component upgrades may be performed on the components in the switch device, reducing the support requirements associated with component upgrades.

In an embodiment, during or prior to the method 500, the management controller system switch device 310 in the switch device 202/300 may operate to generate a management controller public key ($MC_{PUB}$) and an associated management controller private key ($MC_{PRIV}$) (i.e., a public/private key pair.) For example, prior to the switch platform provider providing the switch device 202/300 to the customer discussed above, the management controller processing system 404 in the management controller system 310/400 (e.g., a PMC SoC or BMC SoC) may operate to generate a management controller public/private key pair, store the $MC_{PRIV}$ in the key securing device 408, and export the $MC_{PUB}$ to the switch platform provider system 206. The switch platform provider system 206 may then be used to sign the $MC_{PUB}$ with a switch platform provider private key ($SPP_{PRIV}$) to generate a switch-platform-provider-signed $MC_{PUB}$ (X.509 $SPP_{PRIV}$ ($MC_{PUB}$)). The switch platform provider system 206 may then provide the X.509 $SPP_{PRIV}$ ($MC_{PUB}$) to the management controller system 310 in the switch device 202/300 for storage in the non-volatile memory device 410, and may also make the X.509 $SPP_{PRIV}$ ($MC_{PUB}$) available publicly.

Subsequently, the switch device 202 may be provided to the customer, and the release management system 208 will operate to retrieve the $MC_{PUB}$ from the switch device 202, and sign a release management public key ($RM_{PUB}$) with a customer private key ($C_{PRIV}$) to generate a customer-signed $RM_{PUB}$ (X.509 $C_{PRIV}$ ($RM_{PUB}$)). The release management system 208 may then provide the X.509 $C_{PRIV}$ ($RM_{PUB}$) to the management controller system 310 in the switch device 202/300 for storage in the non-volatile memory device 410. As will be appreciated by one of skill in the art in possession of the present disclosure, the specific examples of the public/private key pairs and associated signatures that provide the X.509 certificates discussed above may be utilized during the method 500 to verify and/or authenticate component upgrades and component upgrade requests. However, one of skill in the art in possession of the present disclosure will also appreciate that other verification and/or authentication techniques may be substituted for the specific techniques discussed above while remaining within the scope of the present disclosure as well.

Figure 6:
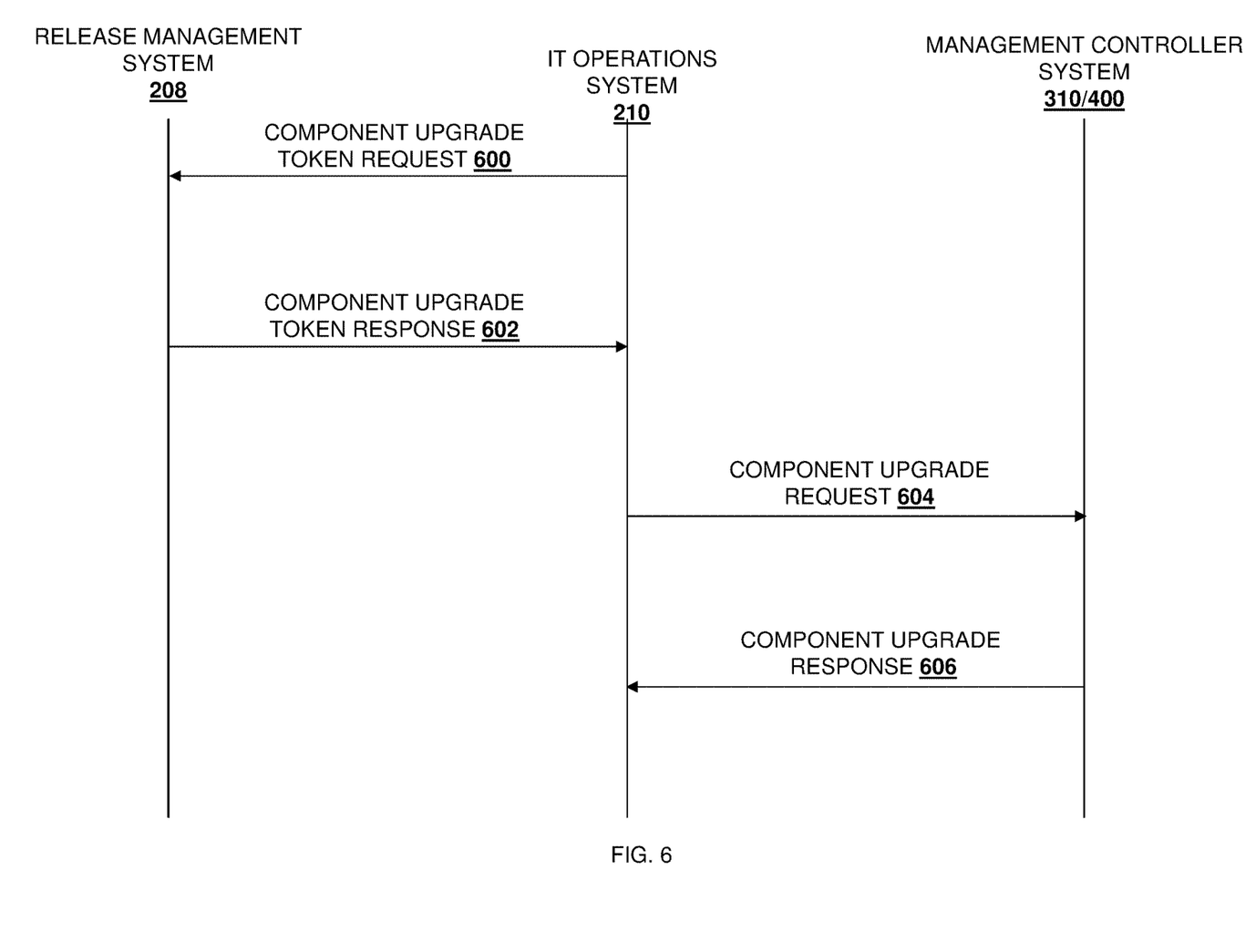
FIG. 6 is a swim-lane diagram illustrating an embodiment of the operations of the networked system of FIG. 2, the switch device of FIG. 3, and the management controller system of FIG. 4 during the method of FIG. 5.

The method 500 begins at block 502 where an IT operations system transmits a component upgrade token request to a release management system. With reference to FIG. 6, in an embodiment of block 502, the IT operations system 210 may transmit a component upgrade token request 600 to the release management system 208. In this example, an IT operations team may wish to upgrade one or more of the components 304a-304d in the switch device 202/300 and, in response, may utilize the IT operations system 210 to generate and transmit the component upgrade token request 600 to the release management system 208. However, while a specific entity is illustrated and described as generating and transmitting the component upgrade token request 600, one of skill in the art in possession of the present disclosure will recognize that other teams and/or systems (e.g., a support team using a support system) may be utilized to generate and transmit the component upgrade request at block 502 while remaining within the scope of the present disclosure as well. Furthermore, in some embodiments, the release management system 208 may perform both the operations of the IT operations system 210 and the release management system 208 discussed below in order to upgrade component(s) in the switch device 202 (e.g., without involvement of the IT operations system 210). Further still, in other embodiments, the switch platform provider system 206 may perform the operations of both the IT operations system 210 and the release management system 208 discussed below in order to upgrade component(s) (e.g., provide firmware updates) in the switch device 202 (e.g., at the request of the management controller system 310 in the switch device 202/300).

In an embodiment, the IT operations system 210 may be authenticated by the release management system 208 (e.g., via a secure channel such as Hypertext Transfer Protocol Secure (HTTPS)) prior to generating and transmitting the component upgrade token request 600 at block 502 and, in response, the IT operations system 210 may then generate the component upgrade token request 600 that includes a unique target identifier for the switch device 202 (e.g., a switch device serial number), a nonce (e.g., to provide "liveliness" to the component upgrade token request 602), a list of component upgrade claims (which may be similar to JavaScript Object Notation (JSON) Web Token (JWT) claims, and may describe the upgrade changes to-be performed on the component(s) in the switch device 202), a IT operations identifier identifying the IT operations team, start and end timestamps for the component upgrade (e.g., corresponding to a maintenance window), and/or other component upgrade token request information that would be apparent to one of skill in the art in possession of the present disclosure. To provide specific examples of the list of component upgrade claims, the list of component upgrade claims for an upgrade to the EEPROM component 304a may include all of the changes to-be performed on the EEPROM component 304a (e.g., as the fields are typically under 32 bytes), while the list of component upgrade claims for images/firmware upgrades for other components may simply include a checksum version associated with those images/firmware. However, while a specific component upgrade token request is described using a JWT, one of skill in the art in possession of the present disclosure will appreciate that component token upgrade requests may be provided using different techniques (e.g., other equivalent token frameworks) while remaining within the scope of the present disclosure as well.

The method 500 then proceeds to block 504 where the release management system validates the component upgrade token request, generates a component upgrade token response, and transmits a component upgrade token response to the IT operations system. With reference to FIG. 6, in an embodiment of block 504, the release management system 208 may receive the component upgrade token request 600 from the IT operations system 210, validate the component upgrade token request 600, generate a component upgrade token response 602, and transmit the component upgrade token response 602 to the IT operations system 210. For example, upon receiving the component upgrade token request 600, the release management system 208 may validate the component upgrade token request 600 by checking if the IT operations system 210 should be allowed to upgrade the switch device (e.g., as identified by a serial number in the component upgrade token request 600), checking the syntax and semantics of the component upgrade claims (e.g., the Type/Length/Value (TLV) data structure provided in fields included in the EEPROM component 304), checking the payload checksums of the boot flash component 304b, the diagnostics storage component 304c, and/or the FPGA component 304d, checking whether the request is valid based on the current state/version of the component firmware, and/or via the performance of any other validation operations that would be apparent to one of skill in the art in possession of the present disclosure. As will be appreciated by one of skill in the art in possession of the present disclosure, if the component upgrade token request 600 cannot be validated, the release management system 208 may disregard the component upgrade token request 600.

In response to validating the component upgrade token request 600, the release management system 208 may operate to generate the component upgrade token response 602 that includes a component upgrade descriptor that describes the component upgrades to-be performed on the switch device 202 (e.g., a nonce, component-upgrade-TokenReq fields mapped to the component upgrade claims, etc.) In an embodiment, the release management system 208 may then sign the component upgrade descriptor with a release management private key ($RM_{PRIV}$) (e.g., that is part of a release management public-private key pair with the $RM_{PUB}$ discussed above) in order to generate a component upgrade JSON Web Signature (JWS) token, and may then create a component upgrade JSON Web Encryption (JWE) token using the component upgrade JWS token.

In one example, in order to create the component upgrade JWE token, the release management system 208 may first generate a Content Encryption Key (CEK), and then may then use the CEK to encrypt the component upgrade JWS token (e.g., via a suitable symmetric key algorithm) in order to produce JWE ciphertext, and optionally a JWE authentication tag. As will be appreciated by one of skill in the art in possession of the present disclosure, the CEK itself may be encrypted with the $MC_{PUB}$ to produce a JWE encrypted key, and the component upgrade JWE token may include the JWE encrypted key, the JWE ciphertext, and optionally the JWE authentication tag. One of skill in the art in possession of the present disclosure will recognize that the encrypted component upgrade JWS token provides a payload that is included within the "outer" component upgrade JWE token.

The release management system 208 may then send the content upgrade JWE token as the component upgrade token response 602, and transmit the component upgrade token response 602 to the IT operations system 210. In some example, the release management system 208 may also transmit a plaintext version of the component upgrade descriptor in the component upgrade token response 602 (e.g., for use as a reference as discussed below.) However, while a specific component upgrade token response is described, one of skill in the art in possession of the present disclosure will appreciate that the component upgrade token response may be provided in a variety of manners that will fall within the scope of the present disclosure as well.

The method 500 then proceeds to block 506 where the IT operations system transmits a component upgrade request including the component upgrade token to a management controller system in a switch device. With reference to FIG. 6, in an embodiment of block 506, the IT operations system 210 may receive the component upgrade token response 602 from the release management system 208, validate the component upgrade token response 602, generate a component upgrade request 604, and transmit the component upgrade request 604 to the management controller system 310/400 in the switch device 202/300. For example, upon receiving the component upgrade token response 602, the IT operations system 210 may validate the component upgrade token response 602 by validating the component upgrade descriptor by, for example, checking if the component upgrade descriptor contains the same switch device serial number, nonce and component upgrade claims that the IT operation system 210 transmitted as part of the component upgrade token request 600, and/or via the performance of any other validation operations that would be apparent to one of skill in the art in possession of the present disclosure. As will be appreciated by one of skill in the art in possession of the present disclosure, if the component upgrade token response 602 cannot be validated, the IT operations system 210 may disregard the component upgrade token response 602.

In response to validating the component upgrade token response 602, the IT operations system 210 may operate to generate the component upgrade request 604 that includes the component upgrade JWE token (with the component upgrade JWS token as its embedded payload along with the JWE encrypted key), as well as component upgrade payload(s) described in the component upgrade descriptor. For example, at block 506, the IT operations system 210 may retrieve the component upgrade payload(s) described in the plaintext version of the component upgrade descriptor that was provided in component upgrade token response 602 by the release management system 208, and provide those component upgrade payload(s) as part of the component upgrade request 604.

As will be appreciated by one of skill in the art in possession of the present disclosure, authorized component upgrade payload(s) may be generated by the switch platform provider system 206, and may include binary files that are configured to upgrade components 304a-304d in the switch device 202/300. In some embodiments, the component upgrade request 604 may be transmitted by the IT operations system 210 and via the network 204 to the central processing system 306 in the switch device 202/300 (e.g., via the communication system 322 and the network processing system 320, or via the management communication system 316), and the central processing system 306 may then provide the component upgrade request 604 via the communication link 314 to the management controller system 310. In other embodiments, the component upgrade request 604 may be transmitted by the IT operations system 210 and via the network 204 to the management controller system 310 directly via the management communication system 316.

The method 500 then proceeds to block 508 where the management controller system decrypts the component upgrade request using, for example, the $MC_{PRIV}$ that was stored during block 408 in order to extract the JWE encrypted key, the JWE ciphertext, and optionally the JWE authentication tag. As illustrated in FIG. 6, in an embodiment of block 508, the management controller system 310/400 receives the component upgrade request 604 from the IT operations system 210. For example, at block 508, the management agent 404a provided by the management controller processing system 404 may receive the component upgrade request 604 including the component upgrade JWE token (with the component upgrade JWS token as its embedded payload) and the component upgrade payload(s) transmitted by the IT operations system 210.

The method 500 then proceeds to block 510 where the management controller system validates the component upgrade request. In an embodiment, at block 510, the management controller system 310/400 may operate to validate the component upgrade request 604. For example, at block 510, the management agent 404a provided by the management controller processing system 404 may operate to decrypt the encrypted CEK using the $MC_{PRIV}$ that is stored in the key securing device 408, and then use that CEK to decrypt the JWE ciphertext in order to access the component upgrade JWS token. The management agent 404a provided by the management controller processing system 404 may then operate to validate the component upgrade request 604 by validating the component upgrade JWS token (e.g., a component upgrade descriptor signed with the $RM_{PRIV}$) using the $RM_{PUB}$ (e.g., via a Digital Signature Algorithm). As will be appreciated by one of skill in the art in possession of the present disclosure, if the component upgrade request 604 cannot be validated (i.e., the component upgrade JWS token is not properly signed using the $RM_{PRIV}$), the management controller system 400/management agent 404a may disregard the component upgrade request 604.

The method 500 then proceeds to block 512 where the management controller system validates a component upgrade payload in the component upgrade request. In an embodiment, at block 512 and in response to validating the component upgrade request 604, the management controller system 310/400 may operate to validate the component upgrade payload that was provided with the component upgrade request 604. For example, in response to validating the component upgrade JWS token in the component upgrade request 604, the management agent 404a provided by the management controller processing system 404 may validate the component upgrade descriptor that includes the unique target identifier for the switch device 202 (e.g., a switch device serial number) and the list of component upgrade claims by checking the syntax and semantics of the component upgrade claims (e.g., the Type/Length/Value (TLV) data structure provided in fields included in the EEPROM component 304), checking the payload checksums of the boot flash component 304b, the diagnostics storage component 304c, and/or the FPGA component 304d, checking whether the request is valid based on the current state/version of the component firmware and its relation to the versions of other component firmware, and/or via the performance of other validation operations that would be apparent to one of skill in the art in possession of the present disclosure. In some examples, components may not be upgraded if they is in an errored state or unless another component includes a specific version, while validations may be based on the current time to verify if the upgrade is performed during a timeframe/maintenance window (and additional validations may be possible).

Furthermore, at block 512, the management agent 404a provided by the management controller processing system 404 may validate one or more pre-conditions (if any exist) for component upgrade control based on the component upgrade claims included in the component upgrade descriptor. As would be appreciated by one of skill in the art in possession of the present disclosure, pre-conditions for component upgrade change control may include a requirement that a component only be updated if other dependent components are configured with a particular software version level. Further still, at block 512, the management agent 404a provided by the management controller processing system 404 may validate any maintenance window (e.g., via start and end timestamps for the component upgrade). However, while a few specific validation operations are described above, one of skill in the art in possession of the present disclosure will appreciate that a variety of validation operations may fall within the scope of the present disclosure as well.

The method 500 then proceeds to block 514 where the management controller system upgrades a switch component in the switch device using the component upgrade payload. In an embodiment, at block 514 and in response to validating the component upgrade request 604 and the component upgrade payload(s), the management controller system 310/400 may operate to upgrade component(s) in the switch device 202. For example, at block 514, the management agent 404a provided by the management controller processing system 404 may operate to disable write protection (if necessary) associated with the communication channel(s) to the components being upgraded, and then call the appropriate component upgrade driver(s) corresponding to the component upgrade payload(s) in order to cause the component upgrade(s) to be performed. As such, at block 514, the management agent 404a provided by the management controller processing system 404 may operate to upgrade any or all of the EEPROM component 304a, the boot flash component 304b, the diagnostics storage device 304c, and/or the FPGA device 304d. With reference to FIG. 6, following the completion of the upgrade operations, the management controller system 310/400 may transmit a component upgrade response 606 to the IT operations system 210 that confirms the completion of the component upgrade. For example, at block 514, the management agent 404a provided by the management controller processing system 404 may transmit the component upgrade response 606, and then log associated component upgrade transaction(s) in the non-volatile memory device 410 and/or the secure storage device 412.

Thus, systems and methods have been described that provide for secure updates of switch component in a switch device by requiring an IT operations team wishing to provide a switch component update to procure a switch component upgrade token that is authorized by a release management team, and produce that switch component upgrade token to a management agent in the switch device that will only perform the switch component upgrade if the switch component upgrade token and associated switch component upgrade payload are validated. For example, the switch component secure upgrade system of the present disclosure may include a dual-ported switch component where one port is coupled to a host CPU SoC via a read-only communication channel, and another port is coupled to a BMC SoC via a read-write communication channel. The BMC SoC receives a switch component upgrade request that is encrypted with a BMC public key, decrypts the switch component upgrade request using a BMC private key, validates the release-management-private-key-signed switch component upgrade request using a release management public key, validates a switch component upgrade payload that is included in the switch component upgrade request and, in response, upgrades the switch component via the read-write communication channel using the switch component upgrade payload.

As such, any entity (e.g., the IT operations system discussed above) that wishes to perform a switch component upgrade on a switch device must contact the owner of that switch device (e.g., the release management system discussed above) to procure a signed and encrypted authorization token that must then be presented along with a switch component upgrade payload to a switch platform agent running on the BMC SoC in the switch device. The switch platform agent acts as the switch platform provider's secure enclave on the switch device, and operates to validate the authorization token before performing the switch component upgrade. Furthermore, the switch components are dual-ported with separate connections to each of the BMC SoC and the host CPU SoC, with the host-CPU-SoC-facing ports configured as read-only and with BMC-SoC-facing ports provided exclusive read/write/update access, ensuring that the switch component upgrade validation discussed above must be performed before a switch component upgrade on the switch device is authorized. For example, if the switch platform provider system has officially released ONIE versions v1, v2, and v3, and the switch device is currently configured using v2, the IT operations system or other user/customer will not be able to upgrade to v3 or downgrade to v1 without authorization of the release management system.

Thus, in specific examples, switch devices may be provided with a BMC/PMC SoC in addition to a host CPU SoC, with the BMC/PMC SOC providing the Root of Trust for the switch device and controlling an embedded keystore. The BMC/PMC SoC is directly attached to read/write ports on dual ported updatable components that also include read-only ports accessible to the host CPU SoC, thereby facilitating a non-bypassable component upgrade (e.g., firmware update) authorization using a nested token that includes an inner token that contains the component upgrade descriptors (e.g., firmware update descriptors) signed by the switch device's owner, and that is encapsulated in an outer token that is encrypted with the public key that is stored in the non-volatile memory device controlled the BMC/PMC SoC. As will be appreciated by one of skill in the art in possession of the present disclosure, such a configuration is agnostic of the host CPU SoC and switch environment (e.g., BIOS, ONIE, DIAG, NOS, grub, etc.), allows for the potential commoditization of ONIE, and enables provisioning of a "component-upgrade-assist" feature for relatively small customers/enterprises in order to automate component upgrades as well as "fresh" installs (e.g., installation of a new diagnostics storage device when one has failed) and/or pushed updates directly from the switch platform provider using the management communication system of the switch device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for securely updating a switch component, comprising:
   receiving, by a management controller system, a component upgrade request that is encrypted with a management controller public key;

decrypting, by the management controller system, the component upgrade request using a management controller private key;

validating, by the management controller system, the component upgrade request, which is signed with a release management private key, using a release management public key;

validating, by the management controller system in response to validating the component upgrade request, a component upgrade payload that is included in the component upgrade request; and upgrading, by the management controller system in response to validating the component upgrade payload, a switch component using the component upgrade payload and via a read-write communication channel that is the only read-write communication channel connected to the switch component that is also connected to a central processing system via a read-only channel that prevents the central processing system from upgrading the switch component.

2. The method of claim 1, wherein the switch component is provided an Electronically Erasable Programmable Read-Only Memory (EEPROM) device, a boot flash device, a diagnostic storage device, a Field Programmable Gate Array (FPGA) device, or a Complex Programmable Logic Device (CPLD).

3. The method of claim 1, wherein the switch component is a dual-ported switch component that includes a first port that is coupled to the read-write communication channel and a second port that is coupled to the read-only channel.

4. The method of claim 1, wherein the decrypting the component upgrade request using the management controller private key includes:

decrypting an encrypted key to retrieve a Content Encryption Key (CEK), which is included in the component upgrade request and encrypted with the management controller public key, using the management controller private key; and decrypting, using the CEK, the component upgrade payload.

5. The method of claim 4, wherein the decrypting the component upgrade payload using the CEK includes:

extracting, using the CEK, a component upgrade token that includes the component upgrade payload.

6. The method of claim 1, wherein the validating the component upgrade payload that is included in the component upgrade request includes:

confirming a switch identifier that is included in the component upgrade payload and that identifies a switch device that includes the switch component;

confirming component upgrade information in the component upgrade payload that describe one or more upgrade operations for the switch component; and determining that at least one component upgrade condition for the one or more upgrade operations is satisfied.

7. The method of claim 1, wherein the upgrading the switch component using the component upgrade payload includes:

disabling write protection for the read-write communication channel; and writing data included in the component upgrade payload to the switch component.

8. A switch component secure upgrade system, comprising:

a switch component;

a central processing system that is connected to the switch component via a read-only communication channel that prevents the central processing system from upgrading the switch component; and a management controller system that is connected to the switch component via a read-write communication channel that allows the management controller system to upgrade the switch component, wherein the management controller system is configured to:

receive a component upgrade request that is encrypted with a management controller public key;

decrypt the component upgrade request using a management controller private key;

validate the component upgrade request, which is signed with a release management private key, using a release management public key;

validate, in response to validating the component upgrade request, a component upgrade payload that is included in the component upgrade request; and upgrade, in response to validating the component upgrade payload, the switch component via the read-write communication channel using the component upgrade payload.

9. The system of claim 8, wherein the switch component is provided an Electronically Erasable Programmable Read-Only Memory (EEPROM) device, a boot flash device, a diagnostic storage device, a Field Programmable Gate Array (FPGA) device, or a Complex Programmable Logic Device (CPLD).

10. The system of claim 8, wherein the switch component is a dual-ported switch component that includes a first port coupled to the read-only communication channel, and a second port coupled to the read-write communication channel.

11. The system of claim 8, wherein the decrypting the component upgrade request using the management controller private key includes:

decrypting an encrypted key to retrieve a Content Encryption Key (CEK), which is included in the component upgrade request and encrypted with the management controller public key, using the management controller private key; and decrypting, using the CEK, the component upgrade payload.

12. The system of claim 11, wherein the decrypting the component upgrade payload using the CEK includes:

extracting, using the CEK, a component upgrade token that includes the component upgrade payload.

13. The system of claim 8, wherein the validating the component upgrade payload that is included in the component upgrade request includes:

confirming a switch identifier that is included in the component upgrade payload and that identifies a switch device that includes the switch component;

confirming component upgrade information in the component upgrade payload that describe one or more upgrade operations for the switch component; and determining that at least one component upgrade condition for the one or more upgrade operations is satisfied.

14. An Information Handling System (IHS), comprising:

a management controller processing system; and a management controller memory system that is coupled to the management controller processing system and that includes instructions that, when executed by the management controller processing system, cause the management controller processing system to provide a management agent that is configured to:

receive a component upgrade request that is encrypted with a management controller public key;

decrypt the component upgrade request using a management controller private key;

validate the component upgrade request, which is signed with a release management private key, using a release management public key;

validate, in response to validating the component upgrade request, a component upgrade payload that is included in the component upgrade request; and upgrade, in response to validating the component upgrade payload, a switch component using the component upgrade payload and via a read-write communication channel that is the only read-write communication channel connected to the switch component that is also connected to a central processing system via a read-only channel that prevents the central processing system from upgrading the switch component.

15. The IHS of claim 14, wherein the switch component is provided an Electronically Erasable Programmable Read-Only Memory (EEPROM) device, a boot flash device, a diagnostic storage device, a Field Programmable Gate Array (FPGA) device, or a Complex Programmable Logic Device (CPLD).

16. The IHS of claim 14, wherein the switch component is a dual-ported switch component that includes a first port that is coupled to the read-write communication channel and a second port that is coupled to the read-only channel.

17. The IHS of claim 14, wherein the decrypting the component upgrade request using the management controller private key includes:

decrypting an encrypted key to retrieve a Content Encryption Key (CEK), which is included in the component upgrade request and encrypted with the management controller public key, using the management controller private key; and decrypting, using the CEK, the component upgrade payload.

18. The IHS of claim 17, wherein the decrypting the component upgrade payload using the CEK includes:

extracting, using the CEK, a component upgrade token that includes the component upgrade payload.

19. The IHS of claim 14, wherein the validating the component upgrade payload that is included in the component upgrade request includes:

confirming a switch identifier that is included in the component upgrade payload and that identifies a switch device that includes the switch component;

confirming component upgrade information in the component upgrade payload that describe one or more upgrade operations for the switch component; and determining that at least one component upgrade condition for the one or more upgrade operations is satisfied.

20. The IHS of claim 14, wherein the upgrading the switch component using the component upgrade payload includes:

disabling write protection for the read-write communication channel; and writing data included in the component upgrade payload to the switch component.

\* \* \* \* \*